United States Patent
Fatemi Booshehri et al.

(10) Patent No.: US 10,395,646 B2
(45) Date of Patent: Aug. 27, 2019

(54) TWO-STAGE TRAINING OF A SPOKEN DIALOGUE SYSTEM

(71) Applicant: Maluuba Inc., Toronto (CA)

(72) Inventors: Seyed Mehdi Fatemi Booshehri, Montreal (CA); Layla El Asri, Montreal (CA); Hannes Schulz, Karlsruhe (DE); Jing He, Toronto (CA); Kaheer Suleman, Cambridge (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 16 days.

(21) Appl. No.: 15/594,308

(22) Filed: May 12, 2017

(65) Prior Publication Data

US 2017/0330556 A1 Nov. 16, 2017

Related U.S. Application Data

(60) Provisional application No. 62/336,163, filed on May 13, 2016.

(51) Int. Cl.

| | |
|---|---|
| *G10L 15/16* | (2006.01) |
| *G10L 15/00* | (2013.01) |
| *G10L 15/06* | (2013.01) |
| *G10L 15/14* | (2006.01) |
| *G10L 25/51* | (2013.01) |
| *G06F 3/16* | (2006.01) |
| *G06N 3/04* | (2006.01) |
| *G10L 15/22* | (2006.01) |

(52) U.S. Cl.
CPC ............ *G10L 15/063* (2013.01); *G06F 3/167* (2013.01); *G06N 3/0427* (2013.01); *G10L 15/14* (2013.01); *G10L 15/16* (2013.01); *G10L 25/51* (2013.01); *G06N 3/0445* (2013.01); *G10L 15/22* (2013.01); *G10L 2015/0638* (2013.01)

(58) Field of Classification Search
None
See application file for complete search history.

(56) References Cited

U.S. PATENT DOCUMENTS

| | | | | |
|---|---|---|---|---|
| 4,741,036 A | * | 4/1988 | Bahl | G10L 15/144 704/256 |
| 6,047,256 A | * | 4/2000 | Koga | G10L 15/063 704/256.7 |
| 9,318,109 B2 | * | 4/2016 | Boies | G10L 15/1815 |
| 10,242,667 B2 | * | 3/2019 | Sharma | G10L 15/1815 |

(Continued)

OTHER PUBLICATIONS

Henderson, "Discriminative Methods for Statistical Spoken Dialogue Systems", in Dissertation Submitted for the Degree of Doctor of Philosophy, University of Cambridge, Feb. 1, 2015, 168 Pages.

(Continued)

*Primary Examiner* — Satwant K Singh

(57) ABSTRACT

Described herein are systems and methods for two-stage training of a spoken dialog system. The first stage trains a policy network using external data to produce a semi-trained policy network. The external data includes one or more known fixed dialogs. The second stage trains the semi-trained policy network through interaction to produce a trained policy network. The interaction may be interaction with a user simulator.

20 Claims, 5 Drawing Sheets

(56) References Cited

U.S. PATENT DOCUMENTS

| | | | |
|---|---|---|---|
| 2015/0179170 A1* | 6/2015 | Sarikaya | G10L 15/22 704/275 |
| 2017/0287478 A1* | 10/2017 | Schulz | G10L 13/08 |
| 2018/0226066 A1* | 8/2018 | Harris | G10L 15/02 |
| 2018/0233143 A1* | 8/2018 | Papangelis | G10L 15/22 |

OTHER PUBLICATIONS

Kenny, et al., "Neurohex: A Deep Q-learning Hex Agent", Retrieved from «https://arxiv.org/abs/1604.07097v2», Apr. 26, 2016, pp. 1-16.

"International Search Report and Written Opinion Issued in PCT Application No. PCT/US2017/032512", dated Aug. 24, 2017, 12 Pages.

Silver, et al., "Mastering the Game of Go with Deep Neural Networks and Tree Search", in International Weekly Journal of Science—Nature, vol. 529, No. 7587, Jan. 28, 2016, 20 Pages.

Wang, et al., "Where does AlphaGo go: from church-turing thesis to AlphaGo thesis and beyond", in Journal of IEEE Automatic Sinica, vol. 3, Issue 2, Apr. 1, 2016, pp. 113-120.

* cited by examiner

TWO-STAGE TRAINING OF A SPOKEN DIALOGUE SYSTEM

CROSS-REFERENCE TO RELATED APPLICATION(S)

This application claims priority to U.S. Provisional Application No. 62/336,163 entitled "Method And System For Training Dialogue Systems," filed on May 13, 2016, of which the entire disclosure is hereby incorporated by reference in its entirety.

BACKGROUND

A spoken dialogue system (SDS) is a computer-based machine designed to converse with a human. A dialogue between the machine and the user relies on turn-taking behavior. For example, a user can ask the machine to locate an Italian restaurant in downtown. In response to the request, the machine may state it was unable find any Italian restaurants in downtown. The user's request and the machine act or response form one turn in the dialogue. As the dialogue progresses, the SDS is able to obtain the information needed to complete one or more user goals (e.g., provide the name and location of an Italian restaurant). How an SDS is trained affects the efficiency and effectiveness of the SDS.

SUMMARY

Embodiments disclosed herein provide a two-stage training technique for a spoken dialogue system (SDS). The first stage trains a policy network using external data to produce a semi-trained policy network. The external data includes one or more known fixed dialogues. The second stage trains the semi-trained policy network through interaction to produce a trained policy network. The interaction may be interaction with a user simulator.

In one aspect, a system includes a spoken dialogue system, a storage device, and a user simulator. The spoken dialogue system includes a policy network and a value network connected to the policy network. The policy network produces a probability distribution over all possible actions in response to a given state of a dialogue. The value network estimates the value of the given state of the dialogue and provides an advantage signal to the policy network. The advantage signal represents a quantified judgement indicating a success level of the policy network if the proposed action by the policy network is selected by the SDS. The storage device is connected to the policy network and stores one or more fixed known dialogues that are used to train the policy network in a first stage of training. The user simulator is connected to the policy network and to the value network and is used to simulate user dialogues to train both the policy network and the value network in a second stage of training.

In another aspect, a method includes training a policy network in a spoken dialogue system using external data to produce a semi-trained policy network. The semi-trained policy network has a first level of training. The semi-trained policy network is then trained through interaction to produce a trained policy network. The trained policy network has an improved or higher level of training compared to the semi-trained policy network. The external data used during the first stage can include one or more known fixed dialogues, while the interaction performed during the second stage can include interactions with a user simulator.

In yet another aspect, a spoken dialogue system includes a policy network and a value network connected to the policy network. The policy network is configured to produce a probability distribution over one or more possible actions in response to a given state of a dialogue. The value network is configured to receive the given state of the dialogue and provide an advantage signal to the policy network that indicates an accuracy of the probability distribution. The advantage signal can represent an estimate of the general value of that given dialogue state in terms of how close the given state of the dialogue is to achieving the user goal. Hence, from each turn of the dialogue to the next, the value of a selected action by the policy network can be judged based on the value of the new state. This quantified judgement is called an advantage and indicates an accuracy of the policy network. The policy network is trained using external data and interaction. The external data used during the first stage can include one or more known fixed dialogues, while the interaction performed during the second stage can include interactions with a user simulator.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures. The elements of the drawings are not necessarily to scale relative to each other. Identical reference numerals have been used, where possible, to designate identical features that are common to the figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In task-oriented spoken dialogues, a user has a goal (or task) he or she wants to achieve in the dialogue. A spoken dialogue system obtains information about the user's goal based on the turns in the dialogue. A turn includes a user spoken language input and a machine action. For example, a user may request a search be performed and the machine action is to provide a search result or asks a question about the search.

A spoken dialogue system typically operates in a domain. The domain is related to the user's goal. For example, in the weather domain, a user may obtain information on the weather (e.g., temperature). Similarly, in the restaurant domain, a user can obtain the name, the address, and/or the telephone number of a restaurant that serves a particular type of food.

Each domain has slot types ("slots") that are associated with the domain. A slot is a variable, and a slot value is a value that fills the slot. For example, in the restaurant domain, a food type may be a slot and a type of food (e.g., "Italian") can be a slot value for that slot. In some situations, one or more slot values change over the course of the dialogue. Over the turns in the dialogue, the spoken dialogue system fills as many slots as possible so that information can be obtained (e.g., query a database) to achieve the user's goal.

The state of the dialogue includes all of the information (e.g., values for slots) that has been collected through the dialogue at a particular point in time. In the Italian restaurant example, when the request for an address of an Italian restaurant that is downtown is the first user turn in the dialogue, the state of the dialogue includes the value "Italian" for the food type slot and the value "downtown" for the location slot. The machine performs an action based on those two values and on the goal of obtaining an address for a restaurant. For example, the SDS can ask the user for a value for an unfilled slot or for confirmation of a previously obtained value.

Figure 1:
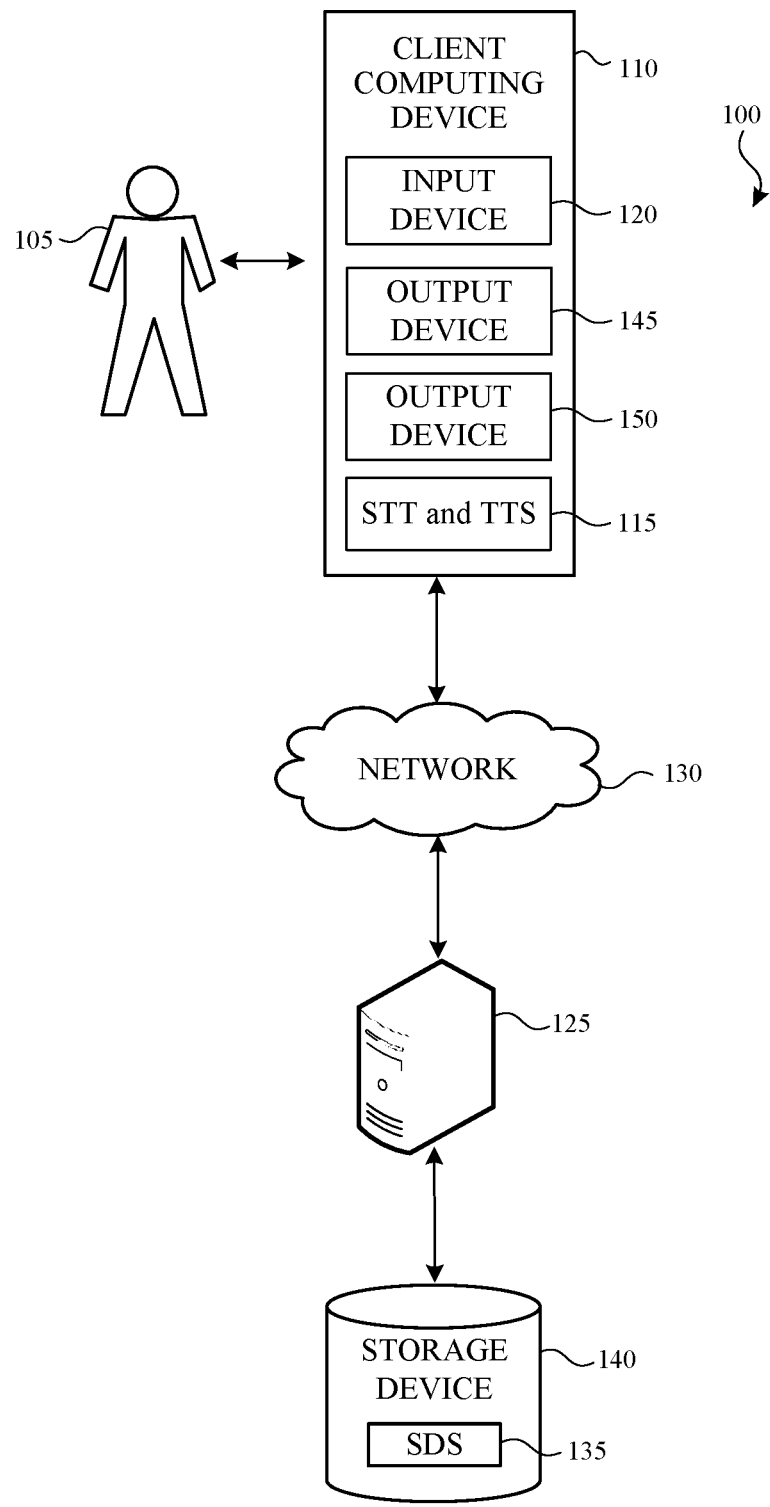
FIG. 1 illustrates an example system that can include a spoken dialogue system.

FIG. 1 illustrates an example system that can include a spoken dialogue system. The system 100 generates and controls a response to a spoken language input. The system 100 allows a user 105 to submit a spoken language input through a client-computing device 110 (e.g., using a speech-to-text application (STT) 115). The client-computing device 110 may include, or be connected to, an input device 120 that receives the spoken language input. The input device 120 may be any suitable type of input device configured to receive a spoken language input. In a non-limiting example, the input device 120 is a microphone.

The client-computing device 110 is configured to access one or more server-computing devices (represented by server-computing device 125) through one or more networks (represented by network 130) to interact with a spoken dialogue system (SDS) 135 stored on one or more storage devices (represented by storage device 140). Based on the spoken language input and on the state of the dialogue, the SDS 135 performs an action. The action may include asking the user 105 (using a text-to-speech application 115) for more information or confirmation through an output device 145 in the client-computing device 110 or connected to the client-computing device 110. One example of an output device 145 is a speaker.

Additionally or alternatively, the SDS 135 can cause information to be presented to the user 105 through another output device 150 in the client-computing device 110 or connected to the client-computing device 110. One example of the output device 150 is a display.

In one or more embodiments, the client-computing device 110 is a personal or handheld computing device having both the input and output devices 120, 145, 150. For example, the client-computing device 110 may be one of: a mobile telephone; a smart phone; a tablet; a phablet; a smart watch; a wearable computer; a personal computer; a desktop computer; a laptop computer; a gaming device/computer (e.g., Xbox); a television; and the like. This list of example client-computing devices is for example purposes only and should not be considered as limiting. Any suitable client-computing device that provides and/or interacts with a spoken dialogue system may be utilized.

As should be appreciated, FIG. 1 is described for purposes of illustrating the present methods and systems and is not intended to limit the disclosure to a particular sequence of steps or a particular combination of hardware or software components.

Figure 2:
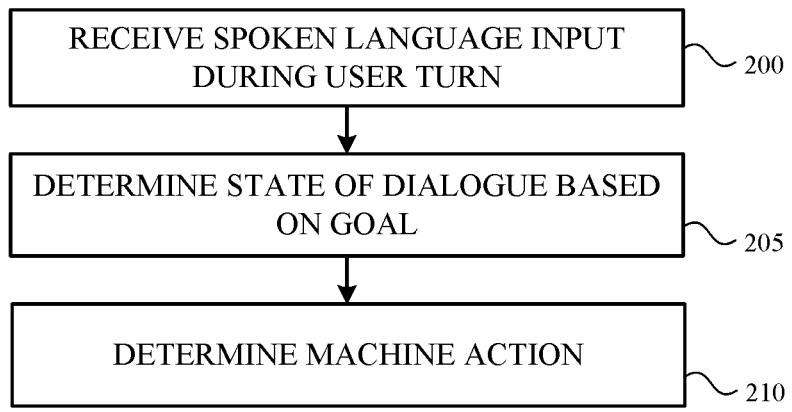
FIG. 2 is a flowchart depicting a method of operating a spoken dialogue system.

FIG. 2 is a flowchart depicting a method of operating a spoken dialogue system. Initially, as shown in block 200, a spoken language input is received during a user turn. The state of the dialogue is then determined at block 205. As described earlier, for a given goal, the state of the dialogue includes the slot values accumulated at that point or time (e.g., obtained during the current user turn and during all previous user turns). Next, as shown in block 210, a machine action is determined and performed based on the state of the dialogue. This process repeats until the machine action achieves the user's goal.

The present invention provides a system and method for training an SDS using two stages of training. The first stage is called a supervised learning stage and the second stage is named a reinforcement learning stage. In one embodiment, during the first and the second stages, a state of a dialogue is input into a neural network or policy network and the policy network outputs the probabilities associated with the possible actions for that state. The action with the highest probability is then selected and performed by the SDS. As will be described in more detail later, the possible actions can be output collectively in one output (e.g., all actions output at once) or the possible actions may be output as a sequence of outputs. This process is repeated for each state of a given dialogue. The given dialogue is one of multiple dialogues that are used to train the SDS.

Figure 3:
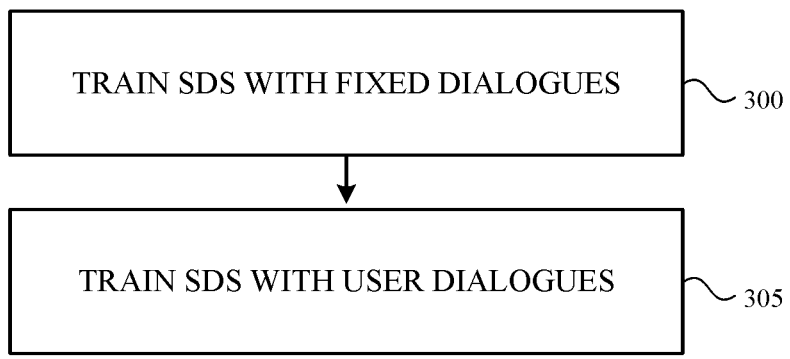
FIG. 3 is a flowchart illustrating a two-stage method of training a spoken dialogue system.

FIG. 3 is a flowchart illustrating a two-stage method of training a spoken dialogue system. Initially, during the first stage, the supervised learning stage, a policy network is trained with known fixed dialogues to produce semi-trained policy network (block 300). The policy network is given a list of actions that correspond to each state. At each turn of a dialogue, the state and the best action (e.g., the action having the highest probability) are known. The policy network learns to emulate the known actions taken in response to each known state. The semi-trained policy network is trained to have a first level of learning or training.

When the first stage is completed, the process passes to block 305 where the second stage, the reinforcement learning stage, trains the semi-trained policy network using user dialogues. User dialogues are not known fixed dialogues. Each user dialogue represents an actual or simulated dialogue in which the state and the best action (e.g., the action having the highest probability) at each turn are not known. In some embodiments, a user simulator simulates each user turn of a dialogue. The second stage produces a trained policy network that has a higher or improved second level of learning or training compared to the first level of learning.

Those skilled in the art will recognize that the second level of learning is typically not the last level of learning. In some embodiments, the SDS continues to learn based on the interactions with live or real-world users. Each time a real-world user interacts with the SDS, for example by asking for information, the SDS (e.g., the policy network) continues to learn and improve such that the level of learning increases over the second level of training or learning.

Figure 4:
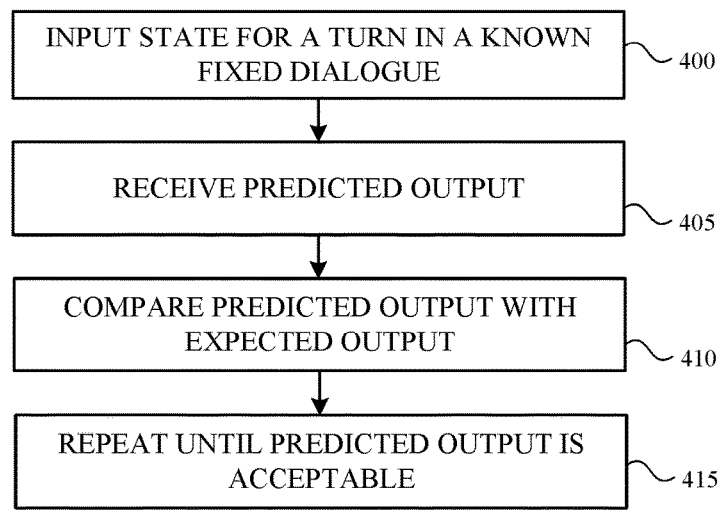
FIG. 4 is a flowchart depicting a supervised learning method that can be used to train a policy network to produce a semi-trained policy network.

FIG. 4 is a flowchart depicting a supervised learning method of training a spoken dialogue system to produce a semi-trained spoken dialogue system. In some embodiments, a given number of high-quality dialogues are collected and used in the supervised learning stage to teach the policy network valid actions for each state. The method is performed for each turn in each dialogue.

Initially, as shown in block 400, for a turn in a known fixed dialogue, a state is input into a policy network. The policy network produces a predicted output based on the received state (block 405). The predicted output includes a probability distribution over all possible actions that can be performed in response to the received state. Since the probabilities of all of the possible actions are known (the expected output), the predicted output is compared to the expected output (block 410). Blocks 400, 405, and 410 are repeated until the predicted output is acceptable. In some embodiments, acceptable output occurs when the categorical cross-entropy between the predicted output and the expected output is minimized. In other embodiments, blocks 400, 405, and 410 are repeated until the probability distribution in the training output differs from the probability distribution in the expected output by a given margin of error (e.g., +/− a certain percentage).

Figure 5:
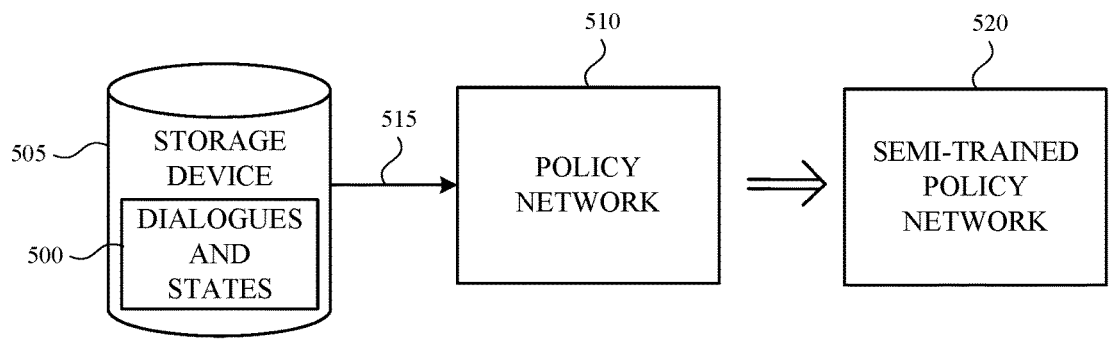
FIG. 5 is a block diagram illustrating the supervised training process.

FIG. 5 is a block diagram illustrating the supervised training process. The known fixed dialogues and associated states 500 are stored in one or more storage devices (represented by storage device 505). The storage device 505 is connected to a policy network 510. During the supervised learning training stage, the policy network 510 receives each state in a given dialogue from the storage device 505 (represented by arrow 515). At the end of the supervised training process, the policy network 510 is a semi-trained policy network 520. As described earlier, the semi-trained policy network has a first level of training or learning.

Figure 6:
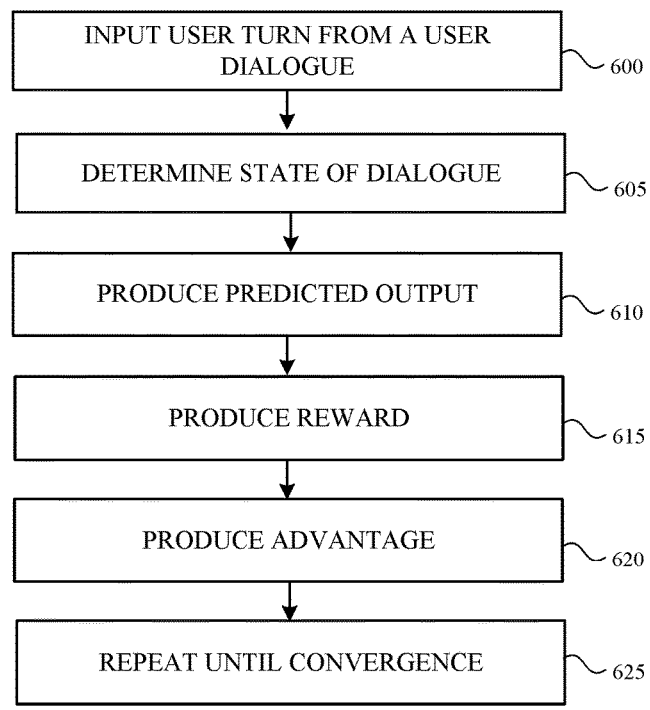
FIG. 6 is a flowchart illustrating a reinforcement learning process that can be used to train a semi-trained spoken dialogue system.

FIG. 6 is a flowchart illustrating a reinforcement learning method of training the semi-trained spoken dialogue system. The method is performed for each turn in each dialogue that is used in the reinforcement learning stage. Initially, as shown in block 600, a user turn from a user dialogue is input into a policy network. As described earlier, the user dialogues are not known fixed dialogues. Each user dialogue represents an actual or simulated dialogue in which the state and the best action (e.g., the action having the highest probability) at each turn are not known.

Next, as shown in blocks 605 and 610, the SDS determines the state of the dialogue and the neural network that is the policy network produces a predicted output given the determined dialogue state. In one embodiment, the predicted output includes the probabilities of all possible actions that can be performed in response to the determined dialogue state. In such embodiments, the number of actions is based mathematically on (the number of slots) multiplied by (the number of possible actions). The result of (the number of slots)×(the number of possible actions) is known as the action space.

In some situations, the action space can be large due to a large number of slots and/or a large number of possible actions. A large action space may adversely impact the training process by increasing the number of computations the policy network must perform, which in turn increases the amount of time needed for training and learning. Thus, in other embodiments, the policy network is a recurrent neural network that can output a sequence of actions (e.g., a sequence of probabilities). The predicted output may be a probability associated with a single action, and the policy network produces a sequence of outputs during the second stage of training. The sequence of outputs can reduce the number of computations, and therefore the amount of time, needed for training. Instead of multiplying (the number of slots) by (the number of possible actions), an addition is performed where (the number of slots) is added to (the number of possible actions). The result is a smaller action space, which can reduce the amount of time needed for training and learning. Additionally, the policy network can handle complex situations with less data.

A reward is then produced by the SDS based on the state of the dialogue and received by a value network that is connected to the policy network (block 615). The value network generates an advantage function or signal at block 620 that indicates the success of the policy network in determining the predicted output. In other words, the advantage signal indicates the benefit of the resulting state if the SDS follows the predicted output. As opposed to the reward, the advantage signal also captures information from all the previous experiments as well as the current one. Hence, it provides a much more accurate judgement about the predicted output of the policy network. In some embodiments, the value network is a neural network.

Based on the advantage signal, the policy network learns to produce a probability distribution that indicates or identifies the best action for the determined state. The policy network is more likely to produce probability distributions that obtain higher reward levels and less likely to produce probability distributions that receive lower reward levels.

In parallel to the policy network, the value network is also trained to produce a more accurate advantage signal using the reward generated by the SDS at each determined dialogue state.

Blocks 600, 605, 610, and 615 repeat until the policy network converges. Convergence occurs when the policy network produces probability distributions that obtain a given reward level (e.g., a substantially stable or leveled-off reward level).

In some embodiments, the policy network uses a policy gradient algorithm to produce the reward. For any differentiable policy $\pi_\theta(b,a)$ the gradient can be defined by the following equation:

$$\nabla J(\theta) = \Sigma_{\pi_\theta}[\nabla_\theta \log \pi_\theta(a|b) Ad(b,a)]$$

where $Ad(b, a) = Q^{\pi_\theta}(b, a) - Ba(b)$ is called the advantage function, with a and b denoting the selected action and the current determined state (also called belief) and $\theta$ denoting the weight vector of the policy network. In some embodiments, the TD error $\delta = R_{t+1} + \gamma V^{\pi_\theta}(B_{t+1}) - V^{\pi_\theta}(B_t)$ is used as the advantage function, where R represents the reward at a given time t, $\gamma$ is a discount factor in [0, 1], $\pi$ is a policy, and $V^{\pi_\theta}(b)$ and $V^{\pi_\theta}(b')$ are the outputs of the value network in the current and next determined states, b and b', respectively. Only one value network may be used when the TD error is employed. The value network can be trained using both experience replay and a target network. For a transition $B_t = b$, $A_t = a$, $R_{t+1} = r$, and $B_{t+1} = b'$, the advantage function is calculated as $\delta_t = r + \gamma V^{\pi_\theta}(b'; \omega_t) - V^{\pi_\theta}(b; \omega_t)$, where t represents a given time and $\omega$ denotes the weight vector of the value network.

In some embodiments, the value network uses a regression algorithm to produce the value function, which then is used directly to produce the advantage function or signal. The regression algorithm may be defined as $J=\mathbb{E}[r+\gamma V^{\omega-}(b')-V^{\omega}(b)]^2$.

Figure 7:
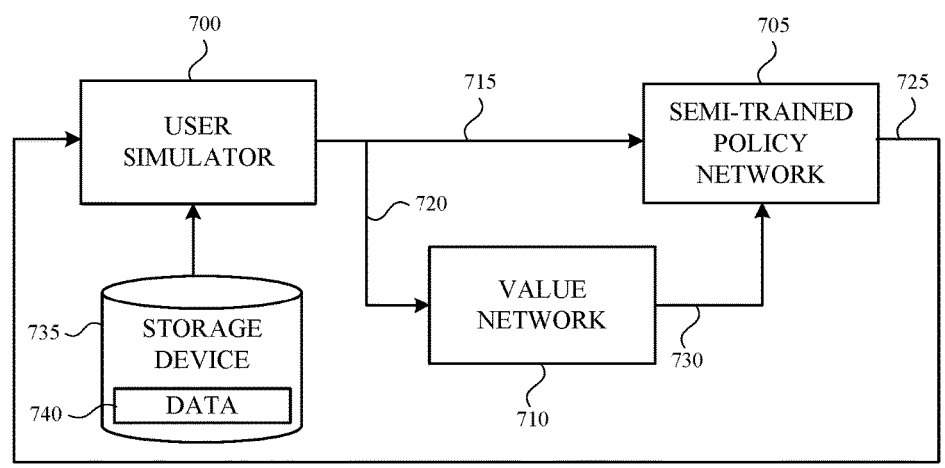
FIG. 7 is a block diagram illustrating the reinforcement learning process.

FIG. 7 is a block diagram illustrating the reinforcement learning process. A user simulator 700 is connected to a semi-trained policy network 705 and a value network 710. During the reinforcement learning training stage, a user turn in a dialogue produced by the user simulator 700 is received by the semi-trained policy network 705 and the value network 710 (represented by arrow 715 and 720, respectively). The semi-trained policy network 705 produces an output that is received by the user simulator 700 (represented by arrow 725). The value network 710 produces an advantage signal that is received by the policy network 705 (represented by arrow 730). A storage device 735 can store data that is used by the user simulator 700 to produce user turns in a dialogue.

Figure 8:
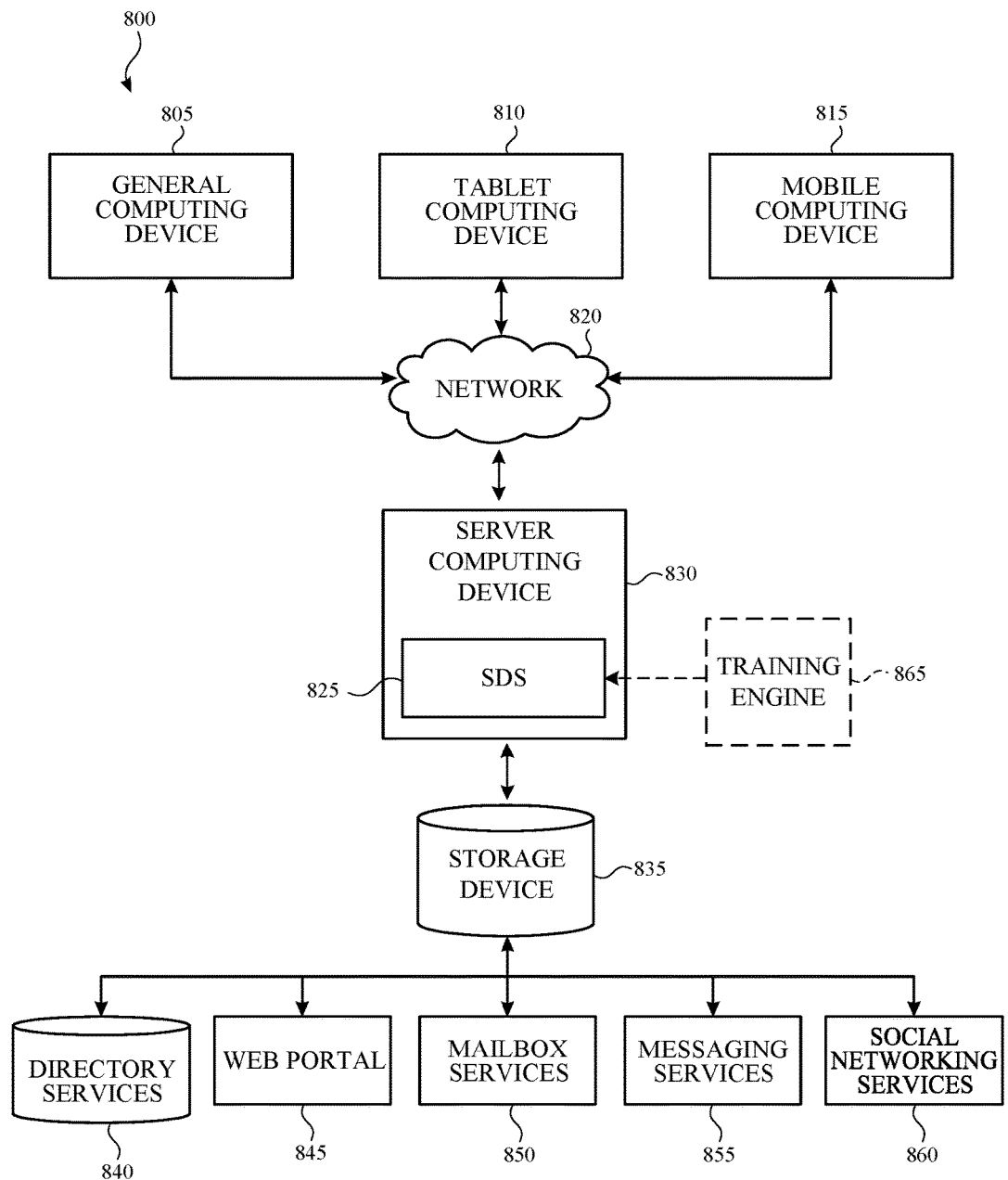
FIG. 8 depicts a block diagram of example distributed system in which aspects of the disclosure may be practiced.

FIG. 8 is a block diagram illustrating a distributed system in which aspects of the disclosure may be practiced. The system 800 generates and controls a response to a spoken language input. The system 800 allows a user to submit a spoken language input through a general computing device 805 (e.g., personal computer), a tablet computing device 810, or mobile computing device 815. The general computing device 1005, the tablet computing device 1010, and/or the mobile computing device 1015 may each include the components shown in the client-computing device 110 of FIG. 1.

The general computing device 805, the tablet computing device 810, and the mobile computing device 815 are each configured to access one or more networks (represented by network 820) to interact with the SDS 825 included in one or more server-computing devices (represented by server-computing device 830). In some aspects, the server-computing device 830 and/or the SDS 825 can access and/or receive various types of information or content when performing an action. The information and data can be stored in one or more storage devices (represented by storage device 835) or transmitted from other sources, such as a directory service 840, a web portal 845, mailbox services 850, instant messaging services 855, and/or social networking services 860. In some instances, these sources may provide robust reporting, analytics, data compilation and/or storage service, etc., whereas other services may provide search engines or other access to data and information, images, videos, document processing and the like.

Although not necessarily part of the system 800, a training engine 865 is used to train the SDS 825 using aspects of the two-stage training technique disclosed herein. The training engine 865 includes the policy network, the storage device(s), the user simulator, and the value network described earlier. The policy network, the storage device(s), and the value network included in the SDS 825 may replicate the policy network, the storage device(s), and the value network included in the training engine 865.

As should be appreciated, FIG. 9 is described for purposes of illustrating the present methods and systems and is not intended to limit the disclosure to a particular sequence of steps or a particular combination of hardware or software components.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A system, comprising:
a spoken dialogue system, comprising:
   a policy network for producing a probability distribution over all possible actions performable in response to a given state of a dialogue; and
   a value network operably connected to the policy network for estimating the given state of the dialogue and providing an advantage signal to the policy network that indicates a success level of the policy network;
a storage device operably connected to the policy network and storing one or more fixed dialogues used to train the policy network in a first stage of training; and
a user simulator operably connected to the policy network and to the value network and used to simulate one or more user dialogues to train the policy network in a second stage of training.

2. The system of claim 1, wherein the first stage of training produces a semi-trained policy network and the second stage of training produces a trained policy network.

3. The system of claim 1, wherein the policy network and the value network each comprises a neural network.

4. The system of claim 1, wherein the trained spoken dialogue system is accessed by a client-computing device.

5. A method, comprising:
training a policy network in a spoken dialogue system using external data comprising one or more fixed dialogues in which a machine action at each turn of a dialogue is known to produce a semi-trained policy network that has a first level of training; and
training the semi-trained policy network through interaction with one or more dialogues in which a machine action at each turn of a dialogue is not known to produce a trained policy network that has a second level of training that is greater than the first level of training.

6. The method of claim 5, wherein training the policy network using one or more fixed dialogues comprises:
receiving, from a storage device, a state of a fixed dialogue in the one or more fixed dialogues;
producing a predicted output, the predicted output comprising a predicted probability distribution over all possible actions; and comparing the predicted output to an expected output, the expected output comprising a known probability distribution over all of the possible actions.

7. The method of claim 6, further comprising repeating the operations of receiving, producing, and comparing to reduce a difference between the predicted output and the expected output.

8. The method of claim 7, wherein the operations of receiving, producing, and comparing are repeated until the difference between the predicted output and the expected output is below a threshold value.

9. The method of claim 7, wherein the operations of receiving, producing, and comparing are repeated until a categorical cross-entropy between the predicted output and the expected output is minimized.

10. The method of claim 5, wherein training the semi-trained policy network through interaction with the one or more dialogues in which the machine action at each turn of the dialogue is not known comprises training the semi-trained policy network using a user simulator that simulates the one or more dialogues in which the machine action at each turn of the dialogue is not known.

11. The method of claim 10, wherein training the semi-trained policy network using the user simulator comprises:
receiving, from the user simulator, a user turn in a dialogue;
in response to receiving the user turn, determining a state of the dialogue;
producing a predicted output based on the determined state of the dialogue, the predicted output comprising a predicted probability distribution over all possible actions or a probability associated with one possible action;
receiving, from a value network, an advantage signal representing a success level of the policy network associated with the predicted output.

12. The method of claim 11, further comprising repeating the operations of receiving, producing, and receiving until the semi-trained policy network achieves a respective convergence.

13. The method of claim 11, wherein the probability associated with the one possible action is included in a sequence of probabilities associated with a sequence of possible actions.

14. A spoken dialogue system, comprising:
a policy network configured to produce a probability distribution over one or more possible actions performable in response to a given state of a dialogue; and
a value network connected to the policy network and configured to receive the given state of the dialogue and provide an advantage signal to the policy network that indicates an accuracy of the probability distribution,
wherein the policy network is trained using one or more fixed dialogues in which a machine action at each turn of a dialogue is known and one or more simulated dialogues in which a machine action at each turn of a dialogue is not known.

15. The spoken dialogue system of claim 14, wherein the one or more dialogues in which the machine action at each turn is not known comprises one or more simulated dialogues received from a user simulator.

16. The spoken dialogue system of claim 14, wherein the policy network uses a policy gradient algorithm to learn to produce the probability distribution, the policy gradient algorithm comprising an advantage function.

17. The spoken dialogue system of claim 16, wherein the value network produces the advantage function using a regression algorithm.

18. The spoken dialogue system of claim 14, wherein the probability distribution over the one or more possible actions comprises a probability distribution over all possible actions.

19. The spoken dialogue system of claim 14, wherein the probability distribution over the one or more possible actions comprises a probability distribution over a sequence of possible actions.

20. The spoken dialogue system of claim 14, wherein the policy network and the value network each comprises a neural network.

* * * * *